(12) United States Patent
Yang et al.

(10) Patent No.: US 9,477,347 B1
(45) Date of Patent: Oct. 25, 2016

(54) TOUCH SCREEN AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 35 days.

(21) Appl. No.: 14/437,089

(22) PCT Filed: Sep. 17, 2014

(86) PCT No.: PCT/CN2014/086729
§ 371 (c)(1),
(2) Date: Apr. 20, 2015

(87) PCT Pub. No.: WO2015/165193
PCT Pub. Date: Nov. 5, 2015

(30) Foreign Application Priority Data

Apr. 29, 2014 (CN) .......................... 2014 1 0178280

(51) Int. Cl.
*G06F 3/0488* (2013.01)
*G06F 3/044* (2006.01)
*G06F 3/041* (2006.01)

(52) U.S. Cl.
CPC ............. *G06F 3/0418* (2013.01); *G06F 3/044* (2013.01); *G06F 3/0412* (2013.01); *G06F 2203/04103* (2013.01); *G06F 2203/04104* (2013.01); *G06F 2203/04107* (2013.01)

(58) Field of Classification Search
CPC ...... G06F 3/0488; G06F 3/044; G06F 3/045; G06F 3/0412
See application file for complete search history.

(56) References Cited

U.S. PATENT DOCUMENTS 6,853,416 B2 * 2/2005 Hamamoto ....... G02F 1/133617
349/106
8,531,408 B2 * 9/2013 Xu .................... G02F 1/134336
345/173

(Continued)

FOREIGN PATENT DOCUMENTS

| CN | 103049155 A | 4/2013 |
| CN | 103049157 A | 4/2013 |

(Continued)

OTHER PUBLICATIONS

International Search Report issued in International Application No. PCT/CN2014/086729 dated Jan. 28, 2015.

(Continued)

*Primary Examiner* — Ricardo L Osorio
(74) *Attorney, Agent, or Firm* — Nath, Goldberg & Meyer; Joshua B. Goldberg

(57) ABSTRACT

The present invention provides a touch screen and a touch display device. The touch screen comprises a plurality of common electrodes, a plurality of driving electrodes and a plurality of sensing electrodes, the common electrodes and the driving electrodes are alternately provided in the same layer, the common electrodes, the driving electrodes and the sensing electrodes are insulated from each other, wherein the sensing electrodes are correspondingly provided in an orthographic projection direction of the common electrodes, each of the sensing electrodes includes a plurality of electrode strips, distribution densities of the electrode strips in edge regions adjacent to the driving electrodes are larger than that in a center region far away from the driving electrodes. The touch screen can reduce the shunt capacitances of the sensing electrodes, increases the touch changes of the touch screen, thus the signal-noise ratio and the performance of the touch screen are remarkably improved.

20 Claims, 2 Drawing Sheets

(56) References Cited

U.S. PATENT DOCUMENTS

| | | | | |
|---|---|---|---|---|
| 8,570,261 | B2 * | 10/2013 | Gu | G02F 1/133512 345/87 |
| 9,151,790 | B1 * | 10/2015 | Hoshtanar | G01R 27/2605 |
| 2012/0313881 | A1 | 12/2012 | Ge et al. | |

FOREIGN PATENT DOCUMENTS

| CN | 103186299 A | 7/2013 |
|---|---|---|
| CN | 103218097 A | 7/2013 |
| CN | 103246408 A | 8/2013 |
| CN | 203178998 U | 9/2013 |
| CN | 103425326 A | 12/2013 |
| CN | 103513837 A | 1/2014 |
| CN | 103995632 A | 8/2014 |
| CN | 203909767 U | 10/2014 |
| TW | 200844827 A | 11/2008 |

OTHER PUBLICATIONS

1st office action issued in Chinese application No. 201410178280.5 dated Jun. 3, 2016.

* cited by examiner

TOUCH SCREEN AND TOUCH DISPLAY DEVICE

This is a National Phase Application filed under 35 U.S.C. §371 as a national stage of PCT/CN2014/086729, filed Sep. 17, 2014, an application claiming the benefit to Chinese Application No. 201410178280.5, filed Apr. 29, 2014; the content of each of which is hereby incorporated by reference in its entirety.

FIELD OF THE INVENTION

The present invention relates to the field of display technology, and particular to a touch screen and a touch display device.

BACKGROUND OF THE INVENTION

Touch screens have various sensing manners, such as optical, microwave, resistive, capacitive sensing manners and the like. The capacitive touch screen is most widely used. The capacitive touch screen includes a self capacitive touch screen and a mutual capacitive touch screen, and compared to the self capacitive touch screen, the mutual capacitive touch screen has advantages of high anti-interference ability, high sensitivity, multi-touch and high recognition ability and the like, and therefore, the mutual capacitive touch screen has become the mainstream touch screen.

The mutual capacitive touch screen generally has two types: one is In Cell touch screen and the other is non In Cell touch screen. The In Cell touch screen means that the sensing electrodes and/or the driving electrodes of the touch screen are provided inside a display panel so as to obtain a compact structure. Currently, a structure in which a certain electrode is shared during displaying and touching is adopted in the In Cell touch screen, such as a common electrode used during displaying may also be used as a driving electrode (TX) when touching. The In Cell touching screen may be manufactured without additional process, thus has characteristics of having very small influence on aperture ratio and transmittance of display pixels, and therefore has a good application prospect.

In the current In Cell touch screen, the driving electrodes (TX) and the sensing electrodes (RX) are provided so as to be staggered with each other in a horizontal direction, for example, for an In Cell touch screen of H-ADS (ADvanced super dimension switch) display mode, the common electrodes are generally divided into blocks along a direction of a row or a column in which the pixel electrodes are located, the common electrode blocks have odd numbers or even numbers are used as the driving electrodes during touching. The sensing electrodes are provided above the common electrodes and opposite thereto, and positions of the sensing electrodes are staggered with those of the driving electrodes in the horizontal direction, that is to say, the sensing electrodes are correspondingly provided opposite to the common electrode blocks, which are not used as the driving electrodes during touching. During touching, mutual capacitances may be formed between the driving electrodes and the sensing electrodes, and the touch screen may be touched by detecting changes in the mutual capacitances.

In the horizontal direction, the sensing electrodes and the driving electrodes are provided adjacently, so that mutual capacitances may be formed between the sensing electrodes and the driving electrodes. The sensing electrodes correspondingly provided above the common electrodes are generally a monoblock, resulting in high shunt capacitances of the sensing electrodes, which is adverse to improve the signal-noise ratio and performance of the whole touch screen.

SUMMARY OF THE INVENTION

In view of the above technical problems in the prior art, the present invention provides a touch screen and a touch display device. The touch screen can not only reduce the shunt capacitances of the sensing electrodes, but also largely increase the touch changes of the touch screen, so that the signal-noise ratio and the whole performance of the touch screen are remarkably improved and increased.

The present invention provides a touch screen, which comprises a plurality of common electrodes, a plurality of driving electrodes and a plurality of sensing electrodes, the common electrodes and the driving electrodes are alternately provided in the same layer, the common electrodes, the driving electrodes and the sensing electrodes are insulated from each other, wherein the sensing electrodes are correspondingly provided in an orthographic projection direction of the common electrodes, each of the sensing electrodes includes a plurality of electrode strips, distribution densities of the electrode strips in edge regions adjacent to the driving electrodes are larger than that in a center region far away from the driving electrodes.

Preferably, the plurality of electrode strips are formed by providing a plurality of hollow regions in the sensing electrode, and the plurality of electrode strips includes a plurality of first electrode strips which are spaced from and parallel to each other and a plurality of second electrode strips which are spaced from and parallel to each other; both the first electrode strips and the second electrode strips are located in edge regions of the sensing electrode adjacent to the driving electrodes, and an angle is formed between a length direction of the first electrode strip and that of the second electrode strip.

Preferably, the length direction of the first electrode strip is perpendicular to a direction along which the common electrodes and the driving electrodes are alternately provided, and the length direction of the second electrode strip is perpendicular to the length direction of the first electrode strip.

Preferably, in the edge region of each of the sensing electrodes close to the driving electrode, any adjacent two of the first electrode strips have a first gap therebetween, and in the central region of each of the sensing electrodes far away from the driving electrode, any adjacent two of the first electrode strips have a second gap therebetween, the second gas is larger than the first gap.

Preferably, the second electrode strips are provided between two adjacent first electrode strips closest to the driving electrode.

Preferably, the touch screen further comprises pixel electrodes arranged in a matrix, the length direction of the first electrode strip is parallel to rows in which the pixel electrodes are located, the first gap is equal to a width of the row in which the pixel electrodes are located, and the second gap is two to four times as large as the first gap.

Preferably, each pixel electrode includes three sub-pixel electrodes which are identical in size and shape, the three sub-pixel electrodes are sequentially arranged with the same gaps therebetween in a direction parallel to the direction of the row in which the pixel electrodes are located; gaps between every adjacent two of the second electrode strips are the same and are equal to a width of a column in which the sub-pixels are located.

Preferably, a horizontal gap between each sensing electrode and a driving electrode adjacent thereto is equal to a width of a row in which the pixel electrodes are located.

Preferably, the touch screen further comprises black matrixes, the first electrode strips and the second electrode strips are provided in an orthographic projection direction of the black matrixes, and the black matrixes completely shield the first electrode strips and the second electrode strips.

Preferably, lengths of the plurality of the first electrode strips are the same and are equal to a length of the row in which the pixel electrodes are located, and the plurality of the first electrode strips have the same width.

Preferably, lengths of the plurality of the second electrode strips are the same and are equal to the first gap, and the plurality of the second electrode strips have the same width.

Preferably, the driving electrode is divided into a plurality of sub-driving electrode blocks, which are separated from each other and have the same area, in a direction parallel to the direction along which the common electrodes and the driving electrodes are alternately provided.

Preferably, each of the sub-driving electrode blocks has a length in a range from 4 to 6 mm, and a width in a range from 1 to 1.5 mm.

Preferably, the touch screen comprises an array substrate and a color filter substrate, which are aligned and assembled, wherein the pixel electrodes are provided on the array substrate, the sensing electrodes are provided on the color filter substrate, and the common electrodes and the driving electrodes are provided on the array substrate or the color filter substrate, and wherein the driving electrodes also functions as common electrodes during displaying.

The present invention further provides a touch display device comprising the above touch screen.

Advantages of the present invention are as follows: in the touch screen in the present invention, the distribution densities of the electrode strips of each sensing electrode in edge regions adjacent to the driving electrode are set to be larger than that in a center region far away from the driving electrode, so that not only the shunt capacitances of the sensing electrodes can be reduced, but also the touch changes of the touch screen can be largely increased, thus the signal-noise ratio and the whole performance of the touch screen are remarkably improved and increased.

With the above touch screen, the touch display device provided in the present invention can increase the signal-noise ratio and the whole performance of the touch display device, and meanwhile, the display effect of the touch display screen is improved.

DETAILED DESCRIPTION OF THE EMBODIMENTS

In order to make a person skilled in the art better understand solutions in the present invention, a touch screen and a touch display device provided in the present invention will be further described below in conjunction with drawings and embodiments.

Embodiment 1

Figure 1:
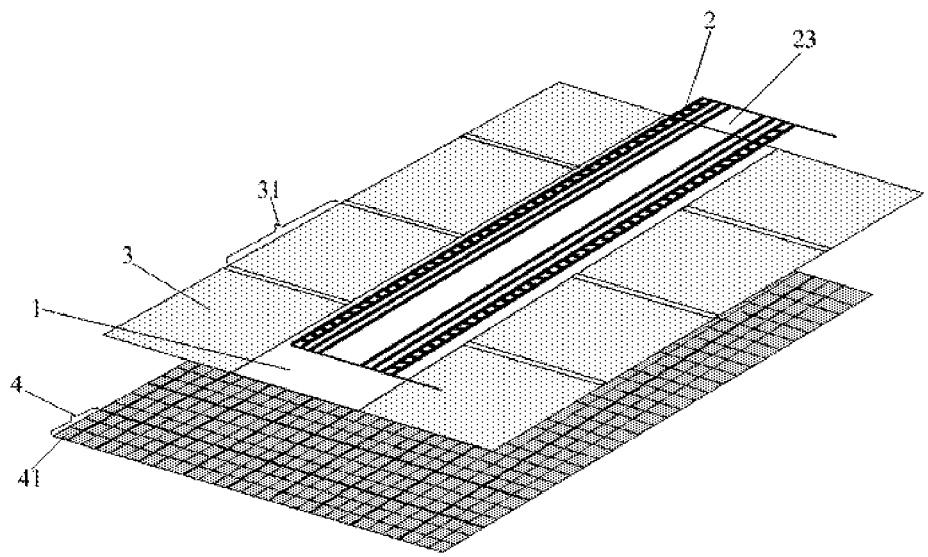
FIG. 1 is a structural diagram of sensing electrodes in an embodiment 1 of the invention.
Figure 2:
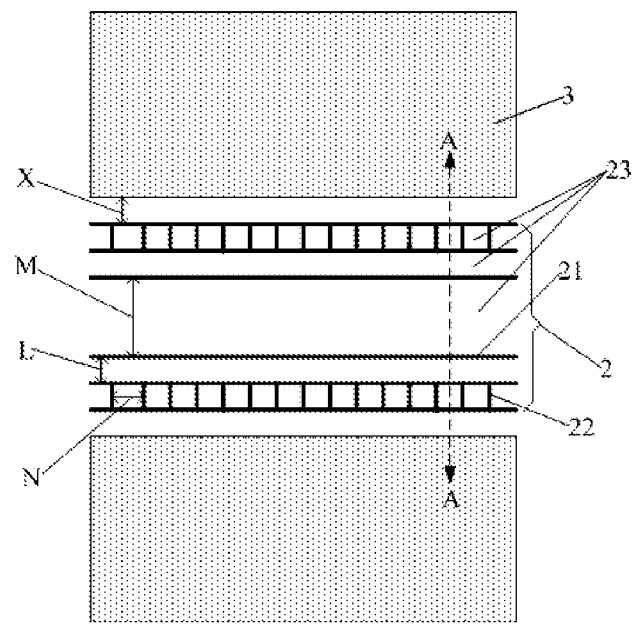
FIG. 2 is a structural top view of the sensing electrodes in FIG. 1.
Figure 3:
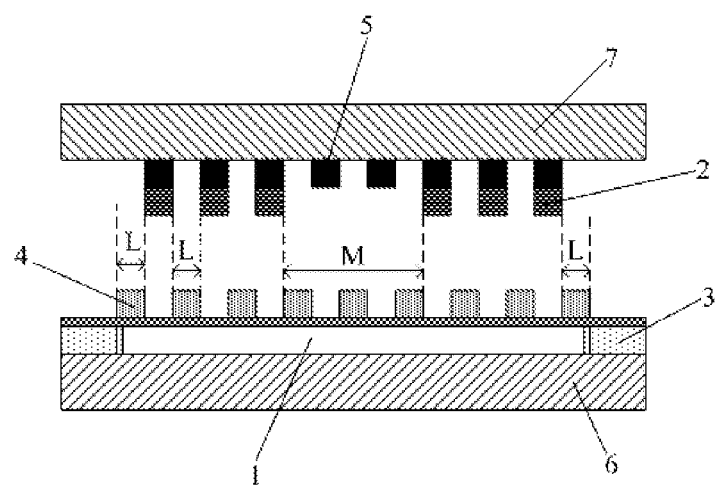
FIG. 3 is a partial cross-sectional view of a touch screen taken along line AA in FIG. 2.

The present embodiment provides a touch screen, as shown in FIG. 1, FIG. 2 and FIG. 3, which comprises a plurality of common electrodes 1, a plurality of driving electrodes 3 and a plurality of sensing electrodes 2, the common electrodes 1 and the driving electrodes 3 are alternately provided in the same layer, the common electrodes 1, the driving electrodes 3 and the sensing electrodes 2 are insulated from each other, and the sensing electrodes 2 are correspondingly provided in an orthographic projection direction of the common electrodes 1.

Each of the sensing electrodes 2 includes a plurality of first electrode strips 21 which are spaced from and parallel to each other and a plurality of second electrode strips 22 which are spaced from and parallel to each other; both the first electrode strips 21 and the second electrode strips 22 are located in edge regions of the sensing electrode 2 adjacent to the driving electrodes 3, as shown in FIG. 2, hollow regions 23 are provided between the first electrode strips 21 and the second electrode strips 22 of the sensing electrode 2, that is, the first electrode strips 21 and the second electrode strips 22 are spaced from each other through the hollow regions 23, and the first electrode strips 21 are electrically connected to the second electrode strips 22, respectively. In addition, it can be seen from FIG. 2 that, distribution densities of the first electrode strips 21 and the second electrode strips 22 of the sensing electrode 2 in edge regions adjacent to the driving electrodes 3 are larger than those in a center region far away from the driving electrodes 3.

In the present embodiment, a length direction of the first electrode strips 21 is perpendicular to a direction along which the common electrodes 1 and the driving electrodes 3 are alternately provided, that is, the length direction of the first electrode strips 21 is the horizontal direction in FIG. 2, and a length direction of the second electrode strips 22 is perpendicular to the length direction of the first electrode strips 21, that is, the length direction of the second electrode strips 22 is the vertical direction in FIG. 2.

As shown in FIG. 2, in the edge region of each of the sensing electrodes 2 close to the driving electrode 3, a gap between any adjacent two of the first electrode strips 21 is a first gap L, and in the central region of each of the sensing electrodes 2 far away from the driving electrodes 3, a gap between any adjacent two of the first electrode strips 21 is a second gap M larger than the first gap L.

The second electrode strips 22 are provided between adjacent two of the first electrode strips 21 close to the driving electrodes 3.

In the present embodiment, the touch screen further comprises pixel electrodes 4 arranged in a matrix, the length direction of the first electrode strip 21 is parallel to rows in which the pixel electrodes 4 are located, the first gap L is equal to a width of the row in which the pixel electrodes 4 are located, and the second gap M is two to four times as large as the first gap L. With such an arrangement, the area of the sensing electrode 2 with respect to ground may be largely reduced, so that the shunt capacitance of the sensing electrode 2 is largely reduced.

As above, the distribution of the first electrode strips 21 of each of the sensing electrodes 2 in the center region far away from the driving electrodes 3 is set to be sparse, and no second electrode strip 22 is provided in the center region far away from the driving electrodes 3, so that the shunt capacitance of the sensing electrode 2 may be reduced. The distribution of the first electrode strips 21 of each of the sensing electrodes 2 in the edge region close to the driving electrode 3 is set to be dense, and the center region is provided with second electrode strips 22, so that distribution of electric field in an adjacent region of the sensing electrodes 2 and the driving electrodes 3 is dense, compared to the distribution of each of the sensing electrodes 2 in the prior art, changes in touch of the touch screen may be largely increased.

In the present embodiment, each pixel electrode 4 includes three sub-pixel electrodes 41 which are identical in size and shape, and used for driving a R sub-pixel, a B sub-pixel and a G sub-pixel constituting a pixel unit, respectively. The three sub-pixel electrodes 41 are sequentially arranged with the same gaps therebetween in a direction parallel to the direction of the row in which the pixel electrodes 4 are located. That is, each pixel electrode 4 consists of a R sub-pixel 41, a B sub-pixel 41 and a G sub-pixel 41 arranged in a line, and a plurality of R sub-pixels 41, a plurality of B sub-pixels 41 and a plurality of G sub-pixels 41 are arranged in rows and columns to form a matrix. Gaps N between every adjacent two of the second electrode strips 22 are the same and are equal to a width of a column in which the sub-pixels 41 are located. In the present embodiment, a horizontal gap X between each sensing electrode 2 and a driving electrode 3 adjacent thereto is equal to a width of a row in which the pixel electrodes 4 are located.

The above configuration of the second electrode strips 22 may largely increase the distribution densities of each of the sensing electrodes 2 in the edge regions adjacent to the driving electrodes 3, so that the distribution densities of electric fields in the edge regions may be largely increased during touching, and in addition, as the horizontal gap between each sensing electrode 2 and the driving electrode thereto is small, changes in touch of the touch screen is largely increased.

In the present embodiment, the touch screen further comprises black matrixes 5, the first electrode strips 21 and the second electrode strips 22 are provided in an orthographic projection direction of the black matrixes 5, and the black matrixes 5 completely shield the first electrode strips 21 and the second electrode strips 22.

The first electrode strips 21 and the second electrode strips 22 are commonly made of a transparent material such as indium tin oxide. However, generally, the transmittance of the transparent material cannot reach 100%, therefore, during displaying, patterns of the first electrode strips 21 and the second electrode strips 22 are easily appeared, affecting the display quality. With the black matrixes 5, it can be ensured that, in a normal touch display, the appearance of the sensing electrodes 2 can be effectively avoided, so that the display effect of the touch screen is further improved.

In the present embodiment, lengths of the first electrode strips 21 are the same and are equal to a length of the row in which the pixel electrodes 4 are located, and the first electrode strips 21 have the same width, and lengths of the second electrode strips 22 are the same and are equal to the first gap L, and the plurality of the first electrode strips 22 have the same width.

It should be noted that, from the settings of the first gap L between two adjacent first electrode strips 21 and the gap N between two adjacent second electrode strips 22, the black matrixes 5, and the lengths and widths of the first electrode strips 21 and the second electrode strips 22, it can be concluded that: parts of the black matrixes 5 for shielding the gate lines are also used to shield the first electrode strips 21 of each sensing electrode 2, and parts of the black matrixes 5 for shielding the data lines are also used to shield the second electrode strips 22 of each sensing electrode 2, so that the whole sensing electrodes 2 are shielded.

In the present embodiment, the driving electrode 3 is divided into a plurality of sub-driving electrode blocks 31, which are spaced from each other and have the same area, in a direction parallel to the direction along which the common electrodes 1 and the driving electrodes 3 are alternately provided. Each of the sub-driving electrode blocks 31 has a length in a range from 4 to 6 mm, and a width in a range from 1 to 1.5 mm. By dividing the driving electrode 3 in such a manner, node capacitance between the driving electrode 3 and the sensing electrode 2 may be reduced, and changes in touch of the touch screen are increased.

In the present embodiment, the touch screen comprises an array substrate 6 and a color filter substrate 7, which are aligned and assembled, wherein the pixel electrodes 4 are provided on the array substrate 6, the sensing electrodes 2 are provided on the color filter substrate 7, and the common electrodes 1 and the driving electrodes 3 are provided on the array substrate 6, and the driving electrodes 1 also functions as common electrodes 1 during displaying. The common electrodes 1 are under the pixel electrodes 4, that is, the touch screen in the present embodiment is an in-cell touch screen in an H-ADS (High Aperture Ratio ADvanced Super Dimension Switch) display mode.

It should be noted that, the common electrodes 1 may also be above the pixel electrodes 4, that is, the touch screen is an in-cell touch screen in an ADS (ADvanced Super Dimension Switch) display mode.

Advantages of the touch screen in the embodiment 1 are as follows: distribution densities of the first electrode strips and the second electrode strips of each sensing electrode in an edge region adjacent to the driving electrode are larger than those in a center region far away from the driving electrode, so that not only the shunt capacitances of the sensing electrodes are reduced, but also changes in touch of the touch screen are largely increased, and the signal-noise ratio and the whole performance of the touch screen are remarkably improved and increased.

Embodiment 2

The present embodiment provides a touch screen, which is different from that in the embodiment 1 in that, an angle, which is not 90 degree, is formed between a length direction of the first electrode strip and that of the second electrode strip, that is, the first electrode strips are not perpendicular to the second electrode strips.

Other structures of the touch screen in the present embodiment are the same as those in the embodiment 1, which will not be repeated herein.

With the above configuration in the present embodiment, not only the shunt capacitances of the sensing electrodes are reduced, but also changes in touch of the touch screen are largely increased, and the signal-noise ratio and the whole performance of the touch screen are remarkably improved and increased.

Embodiment 3

The present embodiment provides a touch screen, which is different from those in embodiments 1 and 2 in that, the pixel electrodes are provided on the array substrate, and the common electrodes and the driving electrodes are provided on the color filter substrate. That is, the touch screen in the present embodiment is an in-cell touch screen in a TN (Twisted Nematic) display mode.

Other structures of the touch screen in the present embodiment are the same as those in the embodiments 1 and 2, which will not be repeated herein.

Advantages of the present invention are as follows: distribution densities of the first electrode strips and the second electrode strips of each sensing electrode in an edge region adjacent to the driving electrode are larger than those in a center region far away from the driving electrode, so that not only the shunt capacitances of the sensing electrodes are reduced, but also changes in touch of the touch screen are largely increased, and the signal-noise ratio and the whole performance of the touch screen are remarkably improved and increased.

Embodiment 4

The present embodiment provides a touch display device comprising the touch screen of any one of the above embodiments 1 to 3.

With the touch screen of any one of the above embodiments 1 to 3, the signal-noise ratio and the whole performance of the touch screen are remarkably improved and increased, and the display quality of the touch display device is also improved.

It should be understood that, the above embodiments are just exemplary embodiments employed to describe the principle of the invention, and the invention is not limited thereto. For persons skilled in the art, various variations and improvements can be made without departing from the spirit and scope of the invention, and these variations and improvements should be considered to belong to the protection scope of the invention.

The invention claimed is:

1. A touch screen, which comprises a plurality of common electrodes, a plurality of driving electrodes and a plurality of sensing electrodes, the common electrodes and the driving electrodes are alternately provided in the same layer, the common electrodes, the driving electrodes and the sensing electrodes are insulated from each other, wherein
the sensing electrodes are correspondingly provided in an orthographic projection direction of the common electrodes, each of the sensing electrodes includes a plurality of electrode strips, and distribution densities of the electrode strips in edge regions adjacent to the driving electrodes are larger than that in a center region far away from the driving electrodes.

2. The touch screen of claim 1, wherein the plurality of electrode strips are formed by providing a plurality of hollow regions in the sensing electrode, and the plurality of electrode strips includes a plurality of first electrode strips which are spaced from and parallel to each other and a plurality of second electrode strips which are spaced from and parallel to each other; both the first electrode strips and the second electrode strips are located in edge regions of the sensing electrode adjacent to the driving electrodes, and an angle is formed between a length direction of the first electrode strip and that of the second electrode strip.

3. The touch screen of claim 2, wherein the length direction of the first electrode strip is perpendicular to a direction along which the common electrodes and the driving electrodes are alternately provided, and the length direction of the second electrode strip is perpendicular to the length direction of the first electrode strip.

4. The touch screen of claim 3, wherein in the edge region of each of the sensing electrodes close to the driving electrode, any adjacent two of the first electrode strips have a first gap therebetween, and in the central region of each of the sensing electrodes far away from the driving electrode, any adjacent two of the first electrode strips have a second gap therebetween, and the second gas is larger than the first gap.

5. The touch screen of claim 4, wherein the second electrode strips are provided between two adjacent first electrode strips closest to the driving electrode.

6. The touch screen of claim 5, further comprising pixel electrodes arranged in a matrix, the length direction of the first electrode strip is parallel to rows in which the pixel electrodes are located, the first gap is equal to a width of the row in which the pixel electrodes are located, and the second gap is two to four times as large as the first gap.

7. The touch screen of claim 6, wherein each pixel electrode includes three sub-pixel electrodes which are identical in size and shape, the three sub-pixel electrodes are sequentially arranged with the same gaps therebetween in a direction parallel to the direction of the row in which the pixel electrodes are located; gaps between every adjacent two of the second electrode strips are the same and are equal to a width of a column in which the sub-pixels are located.

8. The touch screen of claim 7, wherein a horizontal gap between each sensing electrode and a driving electrode adjacent thereto is equal to a width of a row in which the pixel electrodes are located.

9. The touch screen of claim 8, further comprising black matrixes, wherein the first electrode strips and the second electrode strips are provided in an orthographic projection direction of the black matrixes, and the black matrixes completely shield the first electrode strips and the second electrode strips.

10. The touch screen of claim 9, wherein lengths of the plurality of the first electrode strips are the same and are equal to a length of the row in which the pixel electrodes are located, and the plurality of the first electrode strips have the same width.

11. The touch screen of claim 10, wherein lengths of the plurality of the second electrode strips are the same and are equal to the first gap, and the plurality of the second electrode strips have the same width.

12. The touch screen of claim 1, wherein the driving electrode is divided into a plurality of sub-driving electrode blocks, which are separated from each other and have the same area, in a direction parallel to the direction along which the common electrodes and the driving electrodes are alternately provided.

13. The touch screen of claim 2, wherein the driving electrode is divided into a plurality of sub-driving electrode blocks, which are separated from each other and have the same area, in a direction parallel to the direction along which the common electrodes and the driving electrodes are alternately provided.

14. The touch screen of claim 3, wherein the driving electrode is divided into a plurality of sub-driving electrode blocks, which are separated from each other and have the same area, in a direction parallel to the direction along which the common electrodes and the driving electrodes are alternately provided.

15. The touch screen of claim 4, wherein the driving electrode is divided into a plurality of sub-driving electrode blocks, which are separated from each other and have the same area, in a direction parallel to the direction along which the common electrodes and the driving electrodes are alternately provided.

16. The touch screen of claim 5, wherein the driving electrode is divided into a plurality of sub-driving electrode blocks, which are separated from each other and have the same area, in a direction parallel to the direction along which the common electrodes and the driving electrodes are alternately provided.

17. The touch screen of claim 6, wherein the driving electrode is divided into a plurality of sub-driving electrode blocks, which are separated from each other and have the same area, in a direction parallel to the direction along which the common electrodes and the driving electrodes are alternately provided.

18. The touch screen of claim 12, wherein each of the sub-driving electrode blocks has a length in a range from 4 to 6 mm, and a width in a range from 1 to 1.5 mm.

19. The touch screen of claim 18, comprising an array substrate and a color filter substrate, which are aligned and assembled, wherein the pixel electrodes are provided on the array substrate, the sensing electrodes are provided on the color filter substrate, and the common electrodes and the driving electrodes are provided on the array substrate or the color filter substrate, and wherein the driving electrodes also function as common electrodes during displaying.

20. A touch display device comprising the touch screen of claim 1.

* * * * *